(12) United States Patent
Goodman et al.

(10) Patent No.: US 8,234,612 B2
(45) Date of Patent: Jul. 31, 2012

(54) CONE-AWARE SPARE CELL PLACEMENT USING HYPERGRAPH CONNECTIVITY ANALYSIS

(75) Inventors: Benjiman L. Goodman, Cedar Park, TX (US); Nathaniel D. Hieter, Hopewell Junction, NY (US); Jeremy T. Hopkins, Round Rock, TX (US); Samuel I. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 12/862,949

(22) Filed: Aug. 25, 2010

(65) Prior Publication Data

US 2012/0054707 A1    Mar. 1, 2012

(51) Int. Cl.
*G06F 17/50* (2006.01)
(52) U.S. Cl. ......... 716/119; 716/118; 716/122; 716/123
(58) Field of Classification Search .................. 716/118, 716/119, 122, 123
See application file for complete search history.

(56) References Cited

U.S. PATENT DOCUMENTS

| | | | |
|---|---|---|---|
| 5,623,420 A | 4/1997 | Yee et al. | |
| 6,446,248 B1 | 9/2002 | Solomon et al. | |
| 6,791,355 B2 * | 9/2004 | Vergnes | 326/41 |
| 6,799,309 B2 | 9/2004 | Dhanwada et al. | |
| 6,851,099 B1 | 2/2005 | Sarrafzadeh et al. | |
| 6,993,738 B2 * | 1/2006 | Brazell et al. | 716/119 |
| 7,302,662 B2 | 11/2007 | Lee et al. | |
| 7,508,238 B2 * | 3/2009 | Yamagami | 326/103 |
| 7,634,743 B1 | 12/2009 | Ginetti | |
| 7,949,988 B2 * | 5/2011 | Tsai et al. | 716/139 |
| 2003/0233625 A1 * | 12/2003 | Brazell et al. | 716/8 |
| 2008/0237644 A1 | 10/2008 | Tripathi | |
| 2009/0178013 A1 | 7/2009 | Wang et al. | |
| 2010/0023914 A1 | 1/2010 | Sahouria et al. | |

\* cited by examiner

*Primary Examiner* — Sun Lin
(74) *Attorney, Agent, or Firm* — Matthew W. Baca; Jack V. Musgrove

(57) ABSTRACT

Spare cells are placed in an IC design by assigning different spare utilization rates to logic cones, applying the rates to corresponding spare cell regions surrounding cells in the cones, identifying any overlap of regions from different logic cones, and inserting a spare cell at the overlapping region having the highest spare utilization rate. The best location for the spare cell is computed using a hypergraph wherein the cells are edges and the regions are nodes. Any node that is dominated by another node is removed and its edge is extended to the dominating node. The spare cell is inserted in the region having the most edges (the edges can be weighted). The process is repeated iteratively, updating the hypergraph by removing nodes connected to spare cell location, and inserting the next spare cell at a region corresponding to the node which then has the greatest number of connected edges.

21 Claims, 5 Drawing Sheets

$X > Y > Z$

CONE-AWARE SPARE CELL PLACEMENT USING HYPERGRAPH CONNECTIVITY ANALYSIS

BACKGROUND OF THE INVENTION

1. Field of the Invention

The present invention generally relates to the design of semiconductor chips and integrated circuits, and more particularly to a method of inserting spare cell locations in an integrated circuit design to accommodate engineering changes.

2. Description of the Related Art

Integrated circuits are used for a wide variety of electronic applications, from simple devices such as wristwatches, to the most complex computer systems. A microelectronic integrated circuit (IC) chip can be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells.

An IC chip is fabricated by first conceiving a logical (behavioral) description for the circuit, and converting that logical description into a physical description, or geometric layout. This process is carried out in steps, such as first generating a register-transfer level (RTL) description of the circuit based on the logical description, and then using logic synthesis to derive a gate level description or "netlist." A netlist is a record of all of the nets (interconnections) between cell pins, including information about the various components such as transistors, resistors and capacitors. The circuit layout is then checked to ensure that it meets all of the design requirements, particularly timing requirements, and may go through several iterations of analysis and refinement.

Cell placement in semiconductor fabrication involves a determination of where particular cells should optimally (or near-optimally) be located in a layer of an integrated circuit device. Due to the large number of components and the details required by the fabrication process for very large scale integrated (VLSI) devices such as microprocessors and application-specific integrated circuits (ASICs), physical design is not practical without the aid of computers. As a result, most phases of physical design extensively use computer-aided design tools, and many phases have already been partially or fully automated. Automation of the physical design process has increased the level of integration, reduced turn around time and enhanced chip performance. Several different hardware-description programming languages (HDL) have been created for electronic design automation, including Verilog, C, VHDL and TDML. A typical electronic design automation system receives one or more high level behavioral descriptions of an IC device, and translates this high level design language description into netlists of various levels of abstraction.

Once a design is mostly finished, slight modifications may still be required to meet last-minute changes to specifications or for other reasons, usually relayed as an engineering change order (ECO). Because the circuit design is substantially complete (i.e., it conforms to various design requirements such as timing and slew), it is important to minimize the impact of any changes which might otherwise lead to violations and thus require additional iterations of the design steps, meaning significant computational expense. In order to alleviate this predicament, designers place filler (ECO) cells in the circuit design which have no function other than providing spare locations as needed for later changes. These spare locations can be provided in additional to surplus latches that are inserted in a design. A certain percentage of the total number of cells is designated for filler cells, and those cells are randomly placed throughout the layout.

The use of spare cells greatly simplifies implementation of ECOs but there can still be problems with the locations of these cells. Since the filler percentage is applied globally to an entire design, some areas of the circuit which are more stable can end up getting too many filler cells, while other areas do not get enough. Furthermore, typical placement tools can push filler cells away from the most critical logic (which is often unstable), so even though there are filler cells available, they are not located close enough to be of use. Placement tools that partition the logic into separate bins can experience additional stability issues whenever the bin sizes or locations change.

Placement tools (particularly those which attempt to minimize wire length using quadratic placement) naturally pull connected logic together very tightly. This logic clustering effect can be countered by introducing a spreading factor to artificially increase instance sizes globally in a circuit design or portion thereof, i.e., a macro. Forcing cells within the macro to separate in this manner also improves routing and congestion issues. However, this spreading force is not effective for ECO work because it adds only a small amount of space to a large region instead of targeting areas that have a higher potential to change.

These problems are exacerbated in high density circuit designs which have gone through multiple ECOs. The interior filler cells are exhausted early on, leaving an insufficient number of spare cell locations that are still close enough to associated logic gates.

In light of the foregoing, it would be desirable to devise an improved method of placing spare cell locations in an integrated circuit design which could provide a more targeted approach. It would be further advantageous if the method could achieve a more regular spare gate placement to ease late mode timing degradation when implementing ECOs.

SUMMARY OF THE INVENTION

It is therefore one object of the present invention to provide an improved method of placing spare cell locations in an integrated circuit design.

It is another object of the present invention to provide such a method which more accurately places spare cell locations proximate critical logic.

It is yet another object of the present invention to provide such a method which more efficiently places spare cell locations by maximizing the efficacy of spare cell placement which in turn minimizes the number of spare cells needed.

The foregoing objects are achieved in a method of placing spare cells in an integrated circuit design, by receiving a description of the integrated circuit design which includes a plurality of logic cones in a layout, associating candidate spare cell regions in the layout with functional cells in the logic cones, identifying an overlap of candidate spare cell regions associated with functional cells in different logic cones, and inserting a spare cell at one of the candidate spare cell regions which forms the overlap. In the preferred implementation different spare cell insertion rates are assigned to the different logic cones, and the spare cell is inserted in a candidate spare cell region forming the overlap which has a higher spare cell insertion rate. Regions may be considered as overlapping if at least 50% of the area of each region is included in the overlap. Four candidate spare cell regions can be defined for each functional cell, being generally rectangular and forming a ring surrounding a central block in the layout representing the functional cell (or a bounding box for circuit elements that make up the cell). In a further implementation, the best location for the spare cell is computed using a hypergraph. The hypergraph is built by adding an edge to the hypergraph for each of the functional cells, adding a node to the hypergraph for each of the candidate spare cell regions wherein a given node is initially connected to one of the edges corresponding to the functional cell associated with the candidate spare cell region corresponding to the given node, removing any node from the hypergraph that corresponds to a candidate spare cell region which overlaps another candidate spare cell region having a higher spare cell insertion rate (a dominating node). Any edge previously connected to a removed node is connected to the dominating node. The spare cell is then inserted in the candidate spare cell region corresponding to the node having the greatest number of connected edges.

Any edge that corresponds to a functional cell whose four candidate spare cell regions are all dominated can be removed from the hypergraph.

Once a spare cell has been inserted the process may be repeated iteratively, updating the hypergraph by removing edges and nodes attached to the node in which the spare cell is inserted, and inserting the next spare cell at another candidate spare cell region corresponding to the node which now has the greatest number of connected edges.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
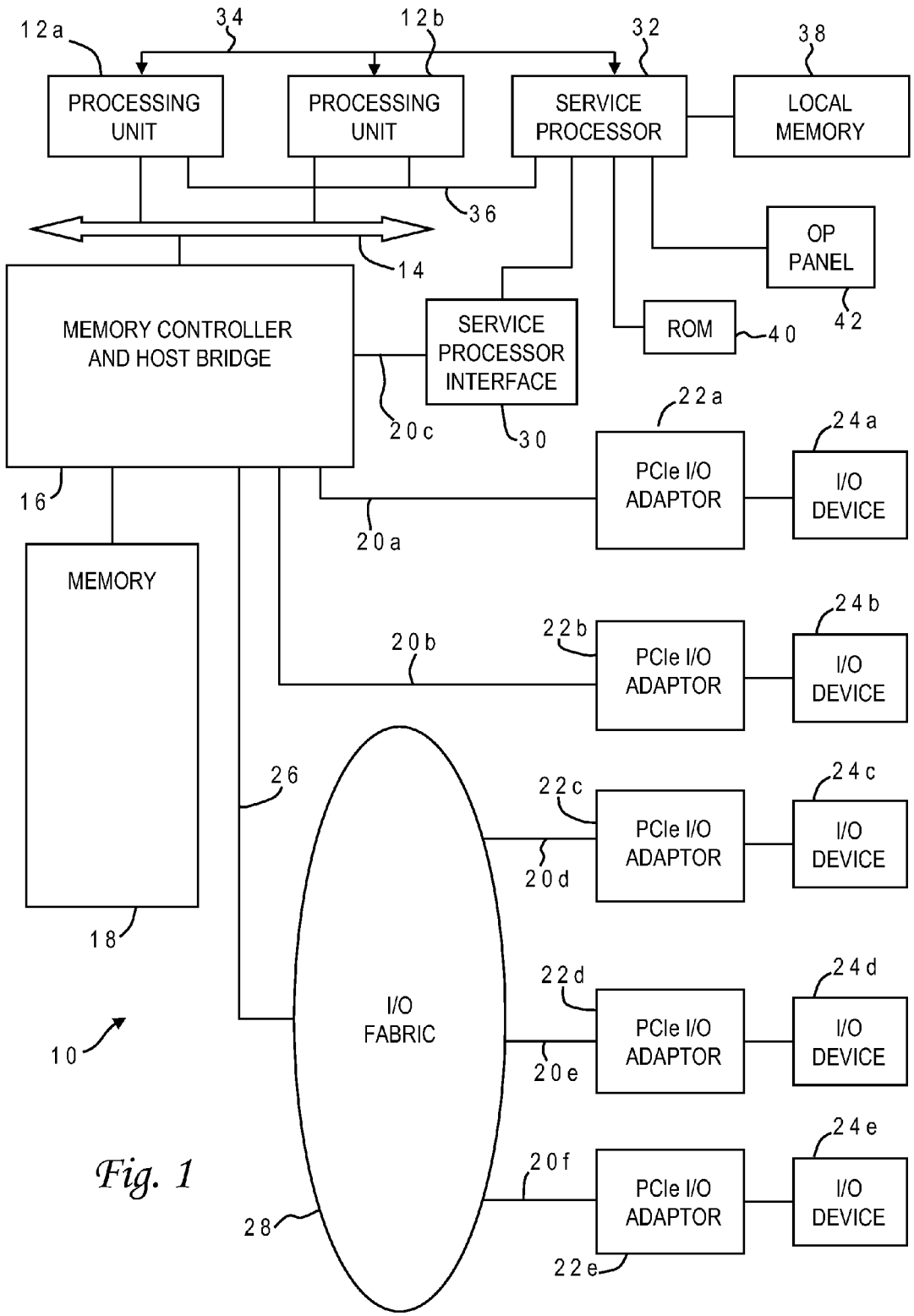
FIG. 1 is a block diagram of a computer system programmed to carry out integrated circuit design in accordance with one embodiment of the present invention.

With reference now to the figures, and in particular with reference to FIG. 1, there is depicted one embodiment 10 of a computer system in which the present invention may be implemented to carry out the design of an integrated circuit. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the circuit design application of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a novel spare cell insertion technique to manage engineering change orders as part of an overall circuit design process. Accordingly, a program embodying the invention may include conventional aspects of various circuit design tools, and these details will become apparent to those skilled in the art upon reference to this disclosure.

Figure 2:
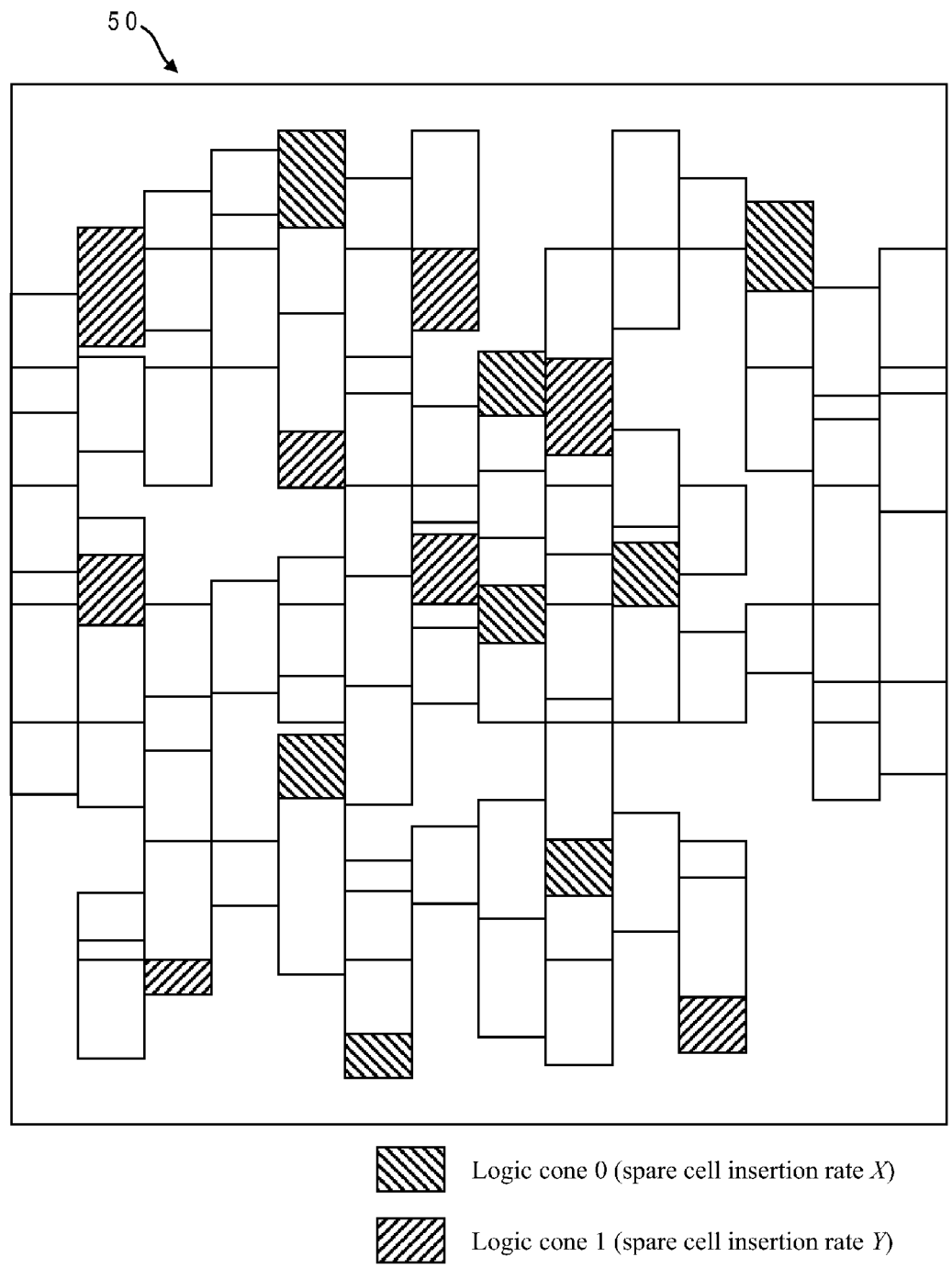
FIG. 2 is a plan view of an integrated circuit layout illustrating logic cones which are assigned different spare cell insertion rates in accordance with one implementation of the present invention.

Referring now to FIG. 2, there is depicted a simplified layout 50 of an integrated circuit design, or portion thereof such as a macro, which may be enhanced by inserting spare cell locations for engineering change orders (ECOs) in accordance with an exemplary application of the present invention. Layout 50 includes a plurality of cells having various sizes and functions according to the intended use of the integrated circuit. The cells can be laid out in an orthogonal coordinate system using horizontal and vertical tracks to provide interconnections between the cells. Layout 50 may be one layer of a multi-layer macro or integrated circuit design. Layout 50 is simplified in that it shows a relatively small number of cells and tracks. State of the art designs for microprocessors and application-specific integrated circuits (ASICs) can have thousands of cells with hundreds of tracks. Computer system 10 can receive a circuit description for layout 50 in the form of a hardware description language (HDL) file created by a designer or an electronic design automation tool. Layout 50 may be an initial layout for the integrated circuit design, or may be a layout resulting from one or more iterations of cell placement and circuit wiring, or other physical design steps.

Certain cells in layout 50 can be logically associated according to their related functionality. A group of such related cells is referred to as a logic cone. A logic cone is basically a schematic fragment, and can be any set of circuitry or logic devices, usually bounded by registers, primary inputs/outputs, or black boxes. For example, a single logic cone may comprise multiple input latches connected to combinational logic cells which are further connected to output latches. A logic cone generally does not refer to the geometry of the physical design, and no such limitation should be inferred. The circuit designer can manually identify logic cones in the design, or the automated design tool can be programmed to define logic cones based on interconnection rules. The HDL file initially received by computer system 10 can include an identification of logic cones within the integrated circuit design.

FIG. 2 illustrates two logic cones in the integrated circuit design comprising two sets of cells having different hashing. The present invention uses cone-aware placement to provide improved location of spare cells, that is, the invention takes into consideration that different cells in a layout are part of different logic cones. As explained below, the present invention can further enhance spare cell placement by assigning different spare cell insertion rates or weightings to different logic cones. In the example of FIG. 2, logic cone 0 has been assigned a spare cell insertion rate of X, while logic cone 1 has been assigned a spare cell insertion rate of Y, where X≠Y. Spare cell insertion rates can be assigned manually by the designer or automatically by the placement tool based on previous settings associated with different cells or cone types. A default spare cell insertion rate may be applied globally with the designer changing the rate only for critical logic. The spare cell insertion rate assigned to a particular logic cone applies to all cells within that cone. If a single cell is included in more than one cone (for example, an output latch of a first logic cone is also an input latch to a second logic cone), it can assume the greatest value assigned to either of the logic cones.

Figure 3:
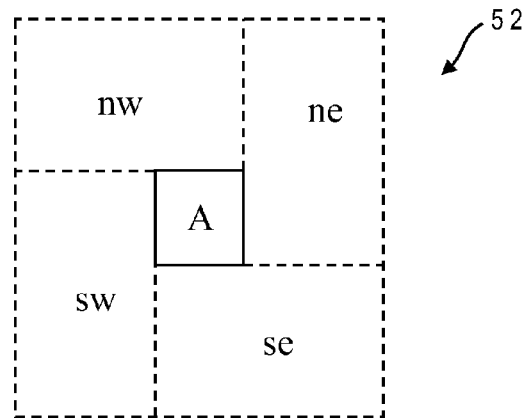
FIG. 3 is a pictorial representation of a cell in an integrated circuit design, the cell having surrounding regions in which spare cells may be placed in accordance with one implementation of the present invention.

With further reference to FIG. 3, the present invention contemplates defining a plurality of spare cell regions that surround a given cell for which spare cell insertion may be desired (i.e., any cell with a spare cell insertion rate greater than zero). In the illustrative implementation, four spare cell regions are defined which are generally rectangular and equal-sized, forming a ring around a central block representing the associated functional cell 52. The block may represent a bounding box for circuit elements that make up the cell. These regions may be labeled using compass directions for ease (northeast, northwest, southeast, southwest), so cell A has four spare cell regions denoted A:ne, A:nw, A:se, A:sw. The specific size of a spare cell region can preferably be adjusted by the designer.

The use of rectangles is exemplary and should not be construed in a limiting sense, although it is particularly useful for Manhattan layouts. The reference to compass directions is similarly not restrictive as these terms are merely based on an arbitrary orientation of the circuit layout as presented to the designer. Other schemes may be employed to define multiple regions surrounding a node including other region shapes (e.g., parallelograms) or more than four regions (e.g., six surrounding hexagons).

Figure 4:
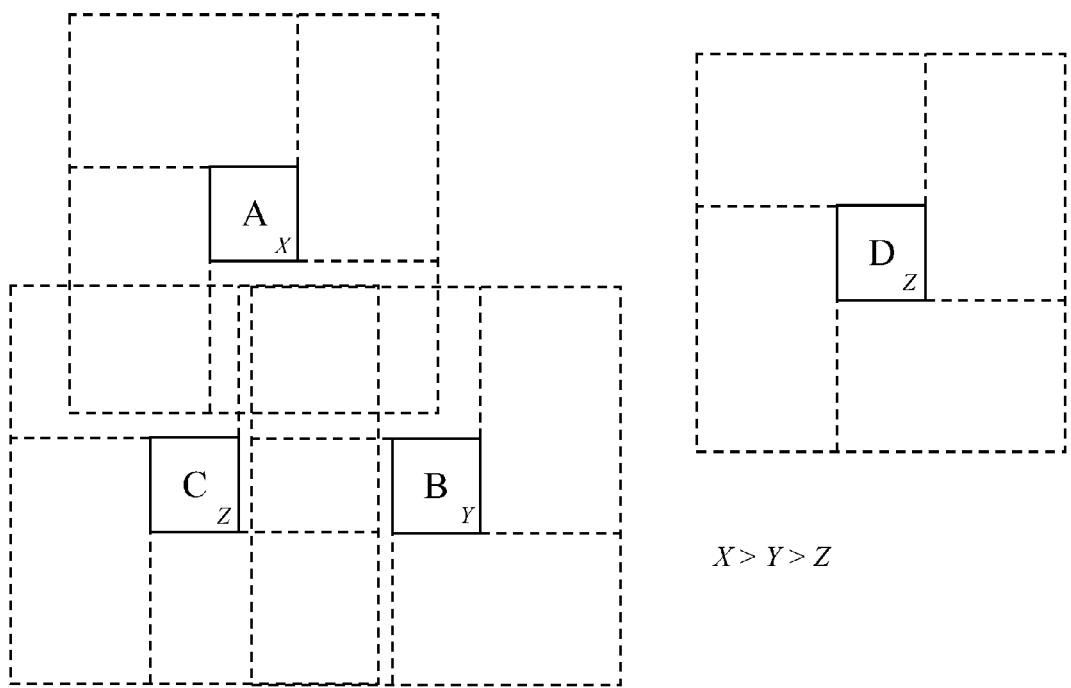
FIG. 4 is a conflict graph constructed in accordance with one implementation of the present invention, for a layout example having four cells wherein three of the cells have overlapping spare cell regions.

These spare cell regions are defined for each of the cells in the different logic cones designated in the integrated circuit description, and are used to create a conflict graph for cells in a given placement area as shown in FIG. 4. The placement area may be the entire layout, a portion thereof such as a bin derived from a partitioning process, or a bounding box of a logic cone. In the simplified example of FIG. 4 there are four cells A, B, C, and D in the bin, each having four surrounding spare cell regions using the model 52 of FIG. 3. Cells A, B and C are also in different logic cones which have been assigned different spare cell insertion rates. Cell A is in a logic cone which is assigned a spare cell insertion rate X. Cell B is in a logic cone which is assigned a spare cell insertion rate Y. Cell C is in a logic cone which is assigned a spare cell insertion rate Z. Cell D is in the same logic cone as cell C and so is assigned the spare cell insertion rate Z as well. Further to this example, X is the largest spare cell insertion rate and Z is the smallest spare cell insertion rate, i.e., X>Y>Z.

The present invention selects a region for spare cell insertion by first identifying any overlapping portions of spare cell regions for cells in different logic cones. In FIG. 4 cells A, B and C each have overlapping portions, while cell D does not overlap with any other cell. Computer system 10 is programmed to select the region presenting the largest conflict (overlap) for spare cell insertion, subject to dominating spare cell insertion rates. This selection process can be carried out using a hypergraph such as that seen in FIG. 5. A hypergraph is a generalization of a graph, having a set of vertices or nodes, and a set of connections or edges which link the nodes. In the context of the present invention, the hypergraph nodes represent candidate spare cell locations while the edges represent functional cells. The hypergraph can be built one cell at a time. Each possible spare cell region for the first cell in the bin is assigned to a node and added to the graph, with the cell edge connecting the nodes. When another cell is added, any region of any cell that is dominated by a region of another cell is removed. The edge previously connected to the removed node is then connected to the conflicting (dominating) node.

Designers can choose different metrics to determine dominance, but in the preferred implementation a first region is considered to be dominated by a second region if at least 50% of the cell regions overlap in area and the second region is assigned a higher spare cell weighting than the first region. If a cell is dominated by other cells in all four of its surrounding regions, that cell is considered redundant and its corresponding edge can be completely removed from the hypergraph.

Thus, in the example of FIG. 4 when cell B is added to the hypergraph, node B:nw is omitted because it overlaps with node A:se more than 50%, and cell A has a higher spare cell insertion rate (X) that cell B (Y). In other words, node A:se dominates node B:nw. Edge B is then connected to node A:se. When cell C is added to the hypergraph, node C:ne is removed because it overlaps with and is dominated by node A:se (X->Z). Node C:nw is removed because it overlaps with and is dominated by node A:sw. Node C:se is removed because it overlaps with and is dominated by node B:sw (Y->Z). Edge C is accordingly extended to nodes A:se, A:sw and B:sw. When cell D is added to the hypergraph, the existing edges and nodes are unaffected because there is no overlap with cell D. The final result once all cells have been added is graphically depicted in FIG. 5.

Upon completion of the hypergraph, the node with the most vectors (edges) indicates the best position to insert the spare cell. This position will always be in one of the spare cell regions which forms the overlap. In an alternative implementation the edges can be weighted according to designer preference, and the spare cell is inserted at the node having the greatest weighted edge value. When that spare cell is inserted into the circuit description, all dependent (connected) nodes are removed from the hypergraph. If there is a tie between multiple nodes having the greatest number of edges, any of those nodes can be randomly selected for spare cell insertion. The process can be repeated iteratively until there are no nodes remaining Spare cell insertion may be subject to some cap such as a globally define limit or percentage.

Figure 5:
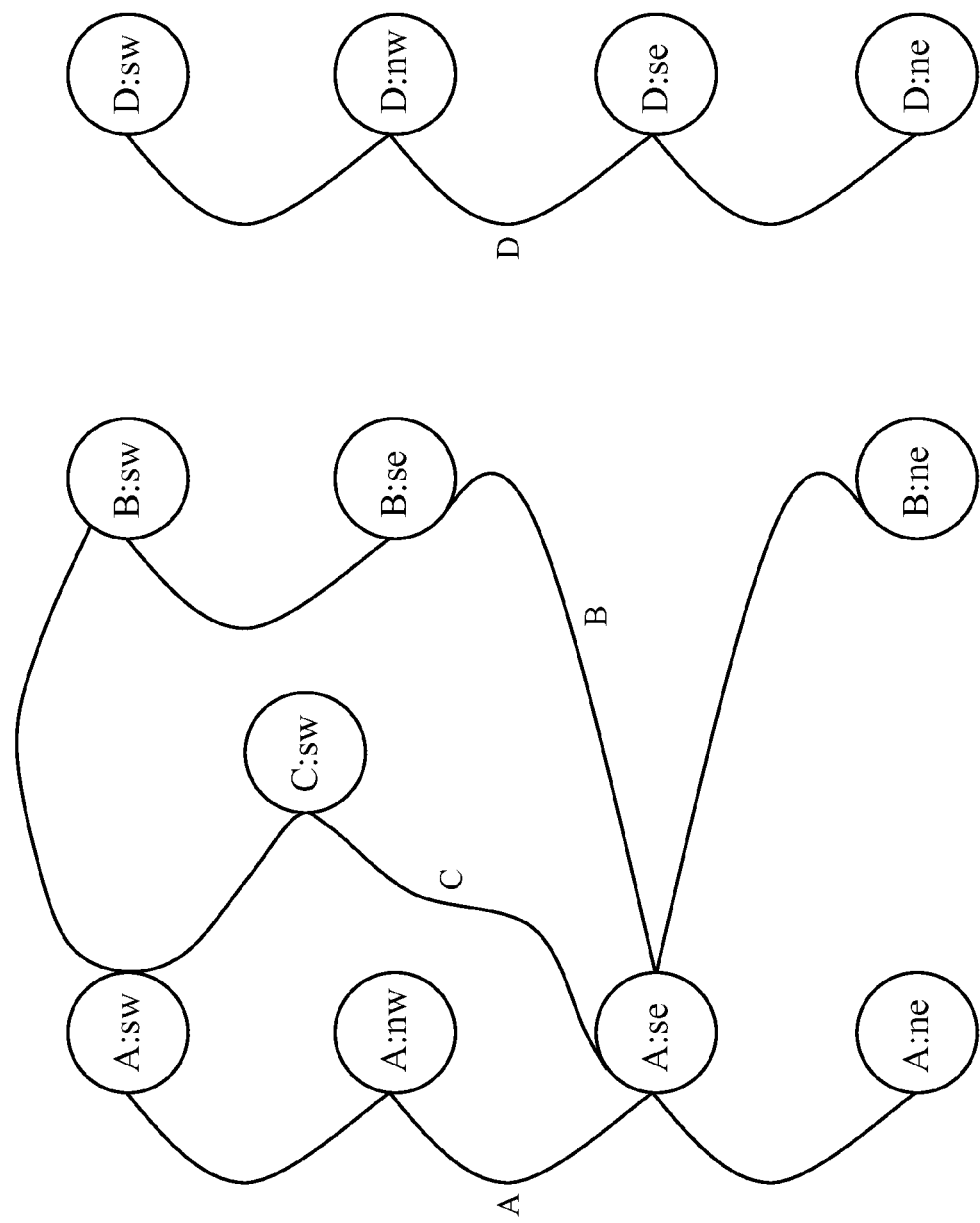
FIG. 5 is a hypergraph with nodes corresponding to the spare cell regions shown in FIG. 4, after removing dominated spare cell regions in accordance with one implementation of the present invention.

For the example of FIGS. 4 and 5, the largest conflict occurs at node A:se, having three edges. The process therefore places the first spare cell location in this region. Since node A:se is connected to all of the other B and C nodes, those nodes are all removed leaving only the D nodes. In the next iteration, a second spare cell is accordingly placed at any one of the nodes D:sw, D:nw, D:se, D:ne, completing the process.

Figure 6:
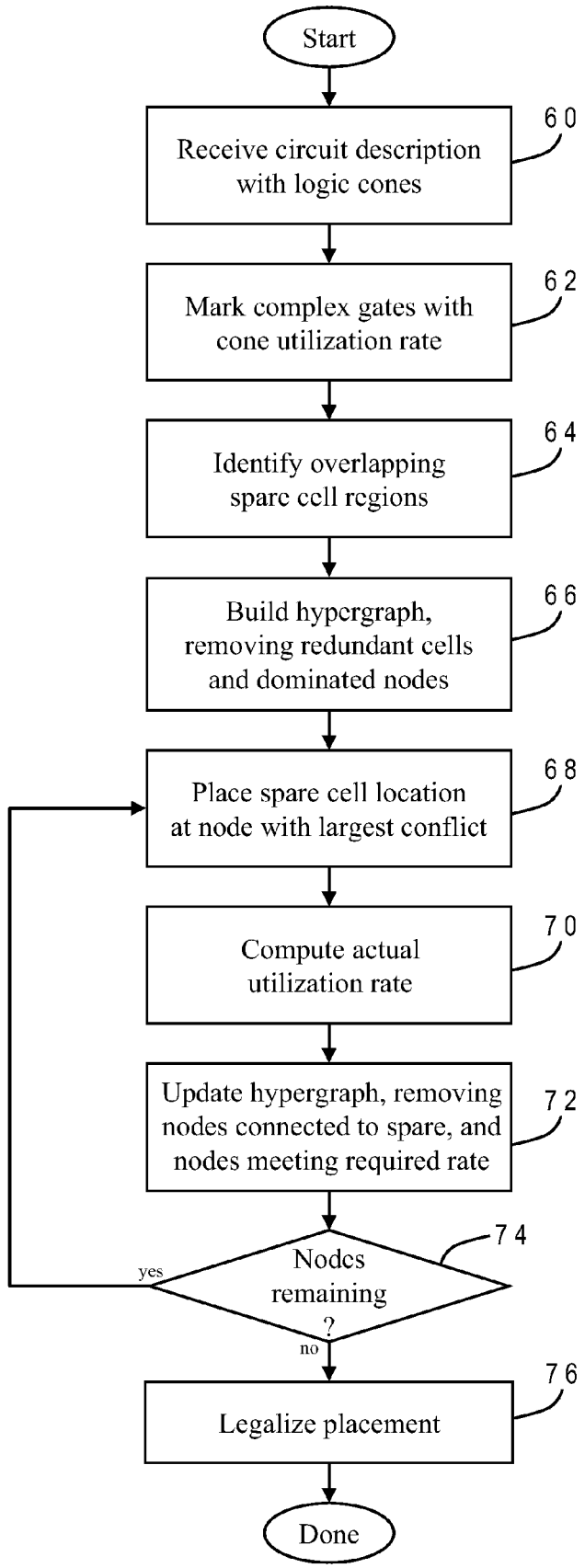
FIG. 6 is a chart illustrating the logical flow for spare cell placement in accordance with one implementation of the present invention.

The invention may be further understood with reference to the flow chart of FIG. 6, illustrating a preferred process for spare cell placement. The process begins by receiving the circuit description, including identification of logic cones (60). Each complex gate is assigned a spare utilization rate corresponding to the cone it is in (62). Any regions which have more than a 50% area overlap are noted (64). A hypergraph is created for the placement area using a model which provides candidate ECO cells surrounding each cell, removing redundant cells and nondominating regions based on spare utilization rates (66). A spare cell is then placed in the circuit description at the candidate region having the greatest conflict (68). The actual spare cell utilization rate for each cone is computed (70). The hypergraph is updated by removing that node of greatest conflict and all connected nodes, and further removing nodes of any cells now meeting the required utilization rate (72). A check is made to see if there are still nodes remaining in the hypergraph (74). If so, the process repeats iteratively at box 68. Once there are no nodes remaining, the spare cell placement is legalized, i.e., spare cells are moved to locations in the layout that are actually available subject to the presence of other objects and design constraints (76).

The present invention accordingly places spare cells in locations which more easily allow logic components to be added for a new or modified design, such as from an engineering change order. The invention overcomes issues with prior art placement tools which tend to closely cluster logic, and is beneficial regardless of the quality of HDL in a design. The method thereby substantially maximizes efficiency of spare cell placement (i.e., maximizing the efficacy of spare cell placement to minimize the number of spare cells that need to be inserted).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer-implemented method of placing spare cells in an integrated circuit design, comprising:
   receiving a description of the integrated circuit design which includes a plurality of logic cones in a layout, by executing first program instructions in a computer system;
   associating candidate spare cell regions in the layout with functional cells in the logic cones, by executing second program instructions in the computer system;
   identifying an overlapping portion of candidate spare cell regions associated with functional cells in different logic cones, by executing third program instructions in the computer system; and
   inserting, in the description of the integrated circuit design, a spare cell at one of the candidate spare cell regions which forms the overlapping portion, by executing fourth program instructions in the computer system.

2. The method of claim 1 wherein the overlapping portion includes at least 50% of area of a first candidate spare cell region associated with a first one of the functional cells in a first one of the logic cones, and includes at least 50% of area of a second candidate spare cell region associated with a second one of the functional cells in a second one of the logic cones.

3. The method of claim 1 wherein said associating defines four candidate spare cell regions for a given functional cell, the four candidate spare cell regions being generally rectangular and forming a ring surrounding a central block representing the given functional cell in the layout.

4. The method of claim 1, further comprising:
   assigning a first spare cell insertion rate to a first one of the different logic cones which includes a first one of the functional cells having a first one of the candidate spare cell regions forming the overlapping portion; and
   assigning a second spare cell insertion rate to a second one of the different logic cones which includes a second one of the functional cells having a second one of the candidate spare cell regions forming the overlapping portion;
   wherein the second spare cell insertion rate is less than the first spare cell insertion rate, and wherein said inserting places the spare cell in the first candidate spare cell region.

5. The method of claim 1 further comprising:
   assigning at least two different spare cell insertion rates to the different logic cones;
   applying the different spare cell insertion rates to the candidate spare cell regions based on which logic cone contains a functional cell associated with a candidate spare cell region; and
   constructing a hypergraph by
      adding an edge to the hypergraph for each of the functional cells,
      adding a node to the hypergraph for each of the candidate spare cell regions, a given node being initially connected to one of the edges corresponding to a functional cell associated with a candidate spare cell region corresponding to the given node,
      removing any node from the hypergraph that corresponds to a candidate spare cell region which overlaps another candidate spare cell region having a higher spare cell insertion rate, and connecting any edge previously connected to a removed node to the node corresponding to the candidate spare cell region having the higher spare cell insertion rate;

wherein said inserting places the spare cell in a candidate spare cell region corresponding to one node having a greatest number of connected edges.

6. The method of claim 5 wherein the hypergraph is further constructed by removing any edge from the hypergraph that corresponds to a functional cell whose associated candidate spare cell regions all overlap other candidate spare cell regions having higher spare cell insertion rates.

7. The method of claim 5 wherein the spare cell is a first spare cell, and further comprising:

updating the hypergraph by removing all nodes having edges connected to the node corresponding to the candidate spare cell region in which the first spare cell is inserted; and inserting, in the description of the integrated circuit design, a second spare cell at another candidate spare cell region corresponding to another node which has a greatest number of connected edges after said updating.

8. A computer system comprising:

one or more processors which process program instructions;

a memory device connected to said one or more processors; and program instructions residing in said memory device for placing spare cells in an integrated circuit design by receiving a description of the integrated circuit design which includes a plurality of logic cones in a layout, associating candidate spare cell regions in the layout with functional cells in the logic cones, identifying an overlapping portion of candidate spare cell regions associated with functional cells in different logic cones, and inserting in the description of the integrated circuit design a spare cell at one of the candidate spare cell regions which forms the overlapping portion.

9. The computer system of claim 8 wherein the overlapping portion includes at least 50% of area of a first candidate spare cell region associated with a first one of the functional cells in a first one of the logic cones, and includes at least 50% of area of a second candidate spare cell region associated with a second one of the functional cells in a second one of the logic cones.

10. The computer system of claim 8 wherein four candidate spare cell regions are defined for a given functional cell, the four candidate spare cell regions being generally rectangular and forming a ring surrounding a central block representing the given functional cell in the layout.

11. The computer system of claim 8 wherein said program instructions further assign a first spare cell insertion rate to a first one of the different logic cones which includes a first one of the functional cells having a first one of the candidate spare cell regions forming the overlapping portion, and assign a second spare cell insertion rate to a second one of the different logic cones which includes a second one of the functional cells having a first one of the candidate spare cell regions forming the overlapping portion, wherein the second spare cell insertion rate is less than the first spare cell insertion rate, and wherein the spare cell is inserted in the first candidate spare cell region.

12. The computer system of claim 8 wherein said program instructions further assign at least two different spare cell insertion rates to the different logic cones, apply the different spare cell insertion rates to the candidate spare cell regions based on which logic cone contains a functional cell associated with a candidate spare cell region, and construct a hypergraph by:

adding an edge to the hypergraph for each of the functional cells;

adding a node to the hypergraph for each of the candidate spare cell regions, a given node being initially connected to one of the edges corresponding to a functional cell associated with a candidate spare cell region corresponding to the given node;

removing any node from the hypergraph that corresponds to a candidate spare cell region which overlaps another candidate spare cell region having a higher spare cell insertion rate; and connecting any edge previously connected to a removed node to the node corresponding to the candidate spare cell region having the higher spare cell insertion rate, wherein said inserting places the spare cell in a candidate spare cell region corresponding to one node having a greatest number of connected edges.

13. The computer system of claim 12 wherein the hypergraph is further constructed by removing any edge from the hypergraph that corresponds to a functional cell whose associated candidate spare cell regions all overlap other candidate spare cell regions having higher spare cell insertion rates.

14. The computer system of claim 12 wherein the spare cell is a first spare cell, and said program instructions further update the hypergraph by removing all nodes having edges connected to the node corresponding to the candidate spare cell region in which the first spare cell is inserted, and insert in the description of the integrated circuit design a second spare cell at another candidate spare cell region corresponding to another node which has a greatest number of connected edges after updating the hypergraph.

15. A computer program product comprising:

a non-transitory computer-readable storage medium; and program instructions residing in said non-transitory computer-readable storage medium for placing spare cells in an integrated circuit design by receiving a description of the integrated circuit design which includes a plurality of logic cones in a layout, associating candidate spare cell regions in the layout with functional cells in the logic cones, identifying an overlapping portion of candidate spare cell regions associated with functional cells in different logic cones, and inserting in the description of the integrated circuit design a spare cell at one of the candidate spare cell regions which forms the overlapping portion.

16. The computer program product of claim 15 wherein the overlapping portion includes at least 50% of area of a first candidate spare cell region associated with a first one of the functional cells in a first one of the logic cones, and includes at least 50% of area of a second candidate spare cell region associated with a second one of the functional cells in a second one of the logic cones.

17. The computer program product of claim 15 wherein four candidate spare cell regions are defined for a given functional cell, the four candidate spare cell regions being generally rectangular and forming a ring surrounding a central block representing the given functional cell in the layout.

18. The computer program product of claim 15 wherein said program instructions further assign a first spare cell insertion rate to a first one of the different logic cones which includes a first one of the functional cells having a first one of the candidate spare cell regions forming the overlapping portion, and assign a second spare cell insertion rate to a second one of the different logic cones which includes a second one of the functional cells having a first one of the candidate spare cell regions forming the overlapping portion, wherein the second spare cell insertion rate is less than the first spare cell insertion rate, and wherein the spare cell is inserted in the first candidate spare cell region.

19. The computer program product of claim 15 wherein said program instructions further assign at least two different spare cell insertion rates to the different logic cones, apply the different spare cell insertion rates to the candidate spare cell regions based on which logic cone contains a functional cell associated with a candidate spare cell region, and construct a hypergraph by:

adding an edge to the hypergraph for each of the functional cells;

adding a node to the hypergraph for each of the candidate spare cell regions, a given node being initially connected to one of the edges corresponding to a functional cell associated with a candidate spare cell region corresponding to the given node;

removing any node from the hypergraph that corresponds to a candidate spare cell region which overlaps another candidate spare cell region having a higher spare cell insertion rate; and connecting any edge previously connected to a removed node to the node corresponding to the candidate spare cell region having the higher spare cell insertion rate, wherein said inserting places the spare cell in a candidate spare cell region corresponding to one node having a greatest number of connected edges.

20. The computer program product of claim 19 wherein the hypergraph is further constructed by removing any edge from the hypergraph that corresponds to a functional cell whose associated candidate spare cell regions all overlap other candidate spare cell regions having higher spare cell insertion rates.

21. The computer program product of claim 19 wherein the spare cell is a first spare cell, and said program instructions further update the hypergraph by removing all nodes having edges connected to the node corresponding to the candidate spare cell region in which the first spare cell is inserted, and insert in the description of the integrated circuit design a second spare cell at another candidate spare cell region corresponding to another node which has a greatest number of connected edges after updating the hypergraph.

* * * * *